Sept. 12, 1950  H. A. PRIDDY  2,521,995
METHOD OF PRODUCING FROZEN WATERMELON CONFECTIONS
Filed Sept. 11, 1948
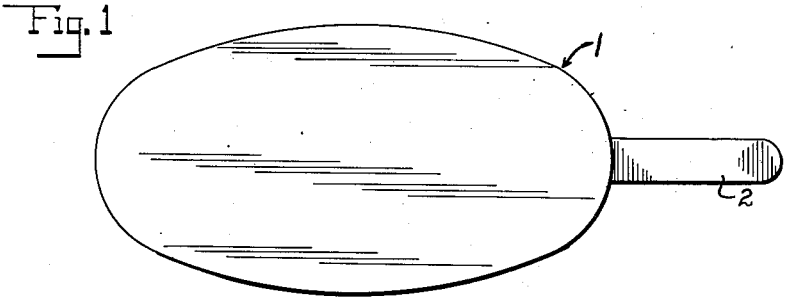
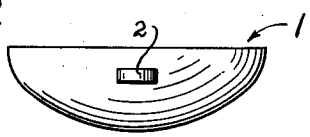
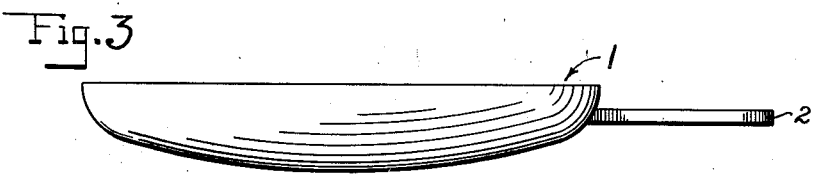
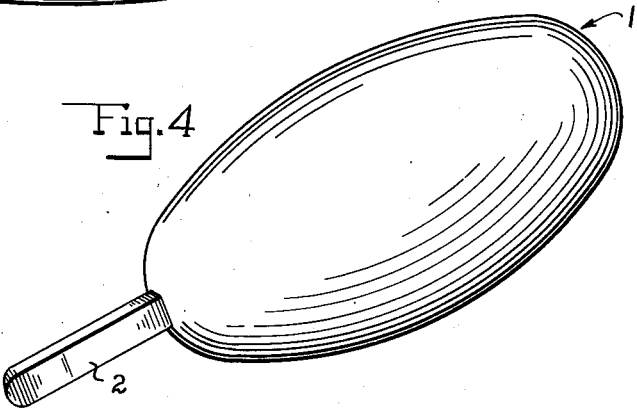
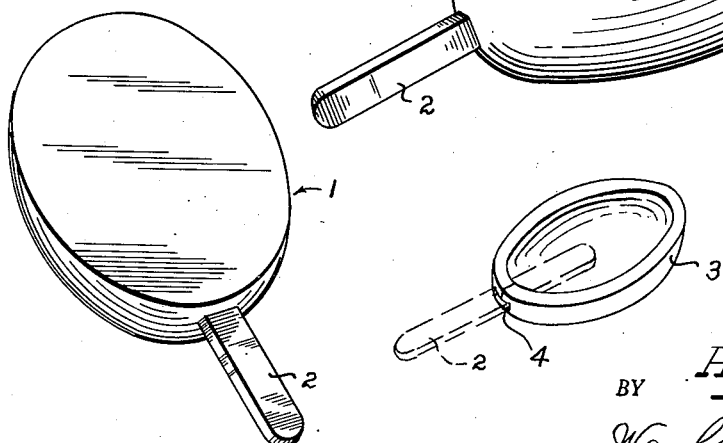
INVENTOR.
Hugh A. Priddy
BY
Wayland D. Keith
HIS AGENT Patented Sept. 12, 1950

2,521,995

UNITED STATES PATENT OFFICE 2,521,995

METHOD OF PRODUCING FROZEN WATERMELON CONFECTIONS

Hugh A. Priddy, Wichita Falls, Tex.

Application September 11, 1948, Serial No. 48,804

3 Claims. (Cl. 99—137)

1

This invention relates to new and novel frozen confections, and particularly to the preparation, preserving, and serving of a confection prepared entirely from the edible portion of melon, such as watermelon.

Various frozen confections have been proposed heretofore, but these, for the most part, have contained synthetic flavoring and a combination of ingredients, while the present invention is prepared of only the naturally ripened, edible portion of melon, such as watermelon, and requires no other ingredient.

The primary object of the present invention is to prepare and preserve the edible portion of watermelon in individual portions, in such manner that they may be eaten as preserved.

Another object of this invention is to prepare, for all season consumption, the edible portion of melons that have heretofore been salable only in season.

Another object of this invention is to prepare and preserve only the edible portion of the melon, thus saving much space.

Another object of this invention is to, in one process, produce a confection that is prepared, frozen, and stored ready for consumption, and which uses only the natural food product.

An embodiment of this invention is illustrated in the accompanying drawing, in which:

Fig. 1 is a top plan view;

Fig. 2 is an end elevational view of the invention;

Fig. 3 is a side elevational view thereof;

Fig. 4 is a perspective view looking at an end and the rounded side;

Fig. 5 is a perspective view from the flattened side and an end thereof; and

Fig. 6 is a perspective view of the confection mold.

In the preparation of the melon for processing the edible portion thereof is crushed or shredded into a homogeneous mass and pressed through a coarse sieve or ricer to remove the fibrous cellulose tissue and the seeds. During this process the juice of the melon is conserved, if necessary, in a separate container. A suitable mold is provided. In the form illustrated, the mold is shown to be the shape of a half melon, because it is a convenient and attractive mold for melon, but the inventor does not wish to limit himself to any particular size or shape for the confection, although the size is preferably limited to a single serving in one mold.

With more detailed reference to the drawing the numeral 1, designates generally, a frozen con-

2 fection in which the meat or pulp of the melon and the juice thereof are frozen about a stick 2, which stick serves as a handle from which the confection is eaten.

The stick or handle 2 may be of any desired size and shape, so long as it is suitable to the size and shape of the mold used, and to the purpose of serving as a handle from which the confection may be eaten.

The mold 3 has a hole 4 in one end thereof, so that the stick may be passed therethrough in such manner that a sufficient length extends into the mold so that the contents of the mold may be frozen therearound, to bind the confection thereto, so that, when removed from the mold, it may be eaten before it falls from the stick or handle, and the stick should extend outward from the mold a sufficient length to serve as a handle. If the mold is made of rubber, the rubber may be slitted from the hole 4 to the top or upper edge of the mold, to make possible the removal of the stick, after which the mold will flex back into its original position.

While only the pulp and juice of the melon is frozen to produce the confection, it is very similar in effect to the cold melon as it is normally served in melon season, both as to appearance and taste.

The prepared meat or pulp of the melon is placed in the mold and the juice added as desired. A few seeds may also be added for flavor and decorative effect. The mold is filled with the naturally ripened pulp and juice of the melon, with a handle in place. The entire unit is then placed in a quick-freeze chamber having a temperature range from 10 degrees F. to 40 degrees F. below zero. The mold is left in the quick freeze chamber until the contents are thoroughly solidified, the actual time depending upon the temperature of the mixture when placed in the chamber, the proportion of juice used, and the size of the mold.

When the mixture in the mold is frozen solid and thoroughly set, it is removed from the mold, which may be of any suitable material, such as metal, rubber, or treated paper. If metal or treated paper is used for the mold, the outside may be flash-heated to remove the frozen confection from the mold, or, if rubber is used, the mold may be flexed to loosen the frozen contents therefrom.

After the frozen confection is removed from the mold, it is wrapped in a moisture repellant covering, such as foil, sheet plastic, treated paper, or other suitable material. The confection is then ready to be stored in a refrigeration chamber which is to be maintained below the freezing temperature. It is also to be understood that the confection must be maintained in the frozen state until served, to be eaten from the stick.

It is to be pointed out that the temperature is the only preservative used. The fresh, ripe melon pulp is prepared and immediately frozen. No pasteurization is necessary and no preservative is used and no coloring matter is added, no flavoring or sugar is used, only the fresh, naturally ripened, edible portion of the melon. Prepared and stored as described, the confection is maintained sweet and fresh, with its natural color over a period of years, and the flavor is enhanced by the melon being frozen over a long period of time.

The melon confection may be removed from the cold storage chamber for serving at any time, and thus preserve for all season use, in sanitary individual servings, a food that has heretofore been marketable only in season. The confection is attractive in appearance and flavor, sanitary to store and serve, and gives a healthful, pure food product.

Having thus described the invention, what is claimed is:

1. A method of preparing and preserving the edible portion of a melon, comprising shredding the watermelon meat, separating the juice from said shredded meat, removing the fibrous tissue from said meat, forming a pulp of said meat and a portion of said juice, and freezing the resultant mixture in a mold to make the confection self-serving.

2. A method of preparing and preserving the edible portion of a watermelon, comprising shredding the melon meat, withdrawing from the shredded meat the juice separated by the shredding operation, removing fibrous tissue from said shredded meat by further comminuting the same, mixing a portion of said juice with said meat and freezing the resultant mixture in a mold of predetermined shape to render the frozen mixture self-serving.

3. A method of making a frozen confection from the edible portion of ripe watermelon, said confection being characterized by the sweetness and flavor of naturally ripened watermelon and being free from added substances, comprising shredding naturally ripened watermelon meat, separating the juice freed from said meat during the shredding operation, straining the shredded meat through a foraminous material, having openings of a size to retain the fibrous tissue therefrom, mixing a portion of said juice and the strained meat to form a homogeneous pulp and freezing said pulp in a mold of predetermined shape, so as to render the resultant confection self-serving.

HUGH A. PRIDDY.

REFERENCES CITED

The following references are of record in the file of this patent:

UNITED STATES PATENTS

| Number | Name | Date |
|---|---|---|
| 1,935,735 | Chauvin | Nov. 21, 1933 |
| 2,043,252 | Kronbach | June 9, 1936 |

OTHER REFERENCES

"The Freezing Preservation of Foods," by Tressler and Evers, second edition, the Avi Publishing Company, Inc., New York, 1947, page 298.